Jan. 20, 1942.  A. RANDALL  2,270,557
AUTOMOBILE SHELF
Filed Sept. 24, 1940  2 Sheets-Sheet 1
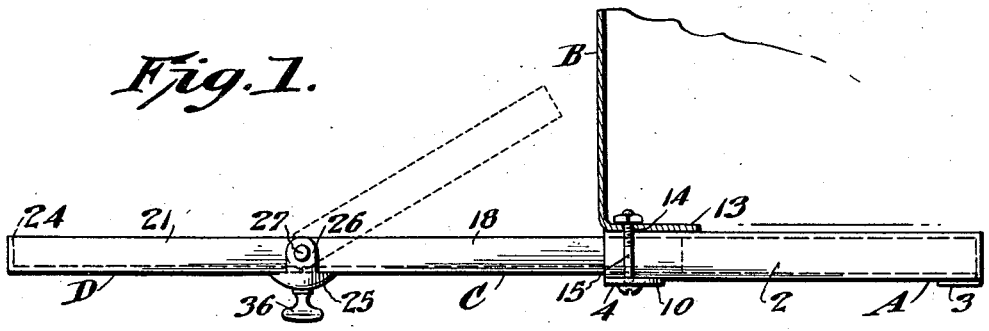
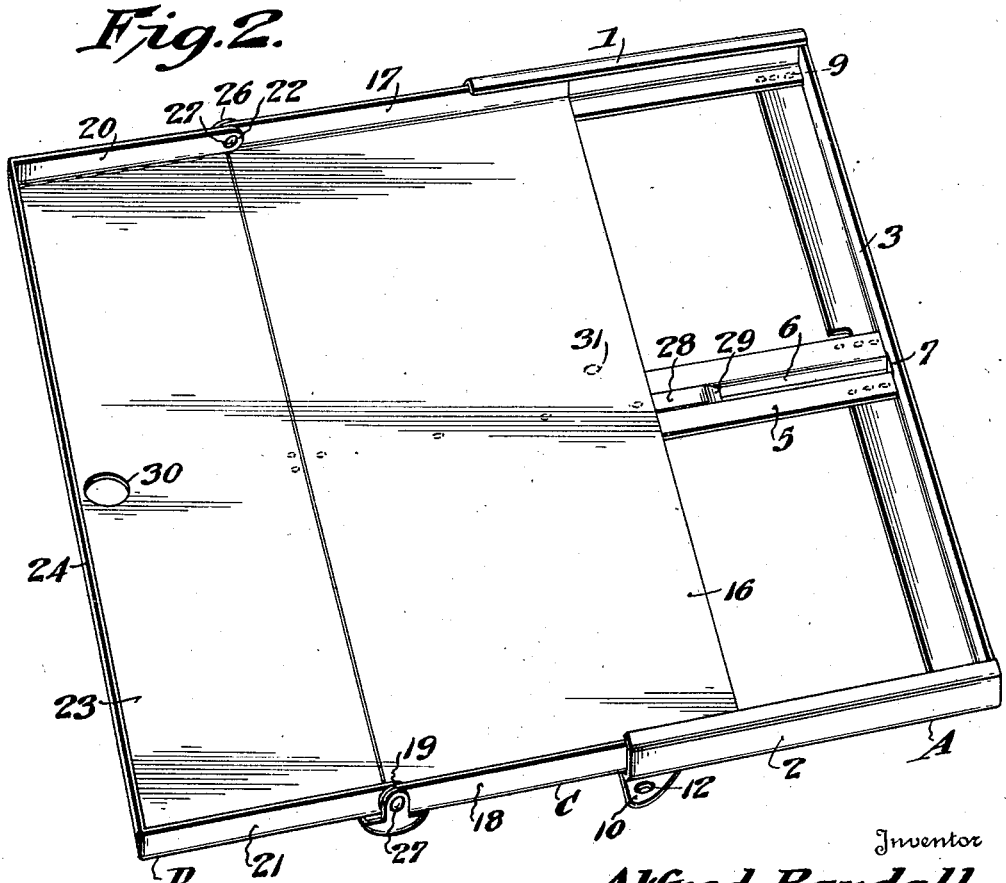
Inventor
Alfred Randall
By Lloyd W. Patch
his Attorney Jan. 20, 1942.  A. RANDALL  2,270,557
AUTOMOBILE SHELF
Filed Sept. 24, 1940   2 Sheets-Sheet 2
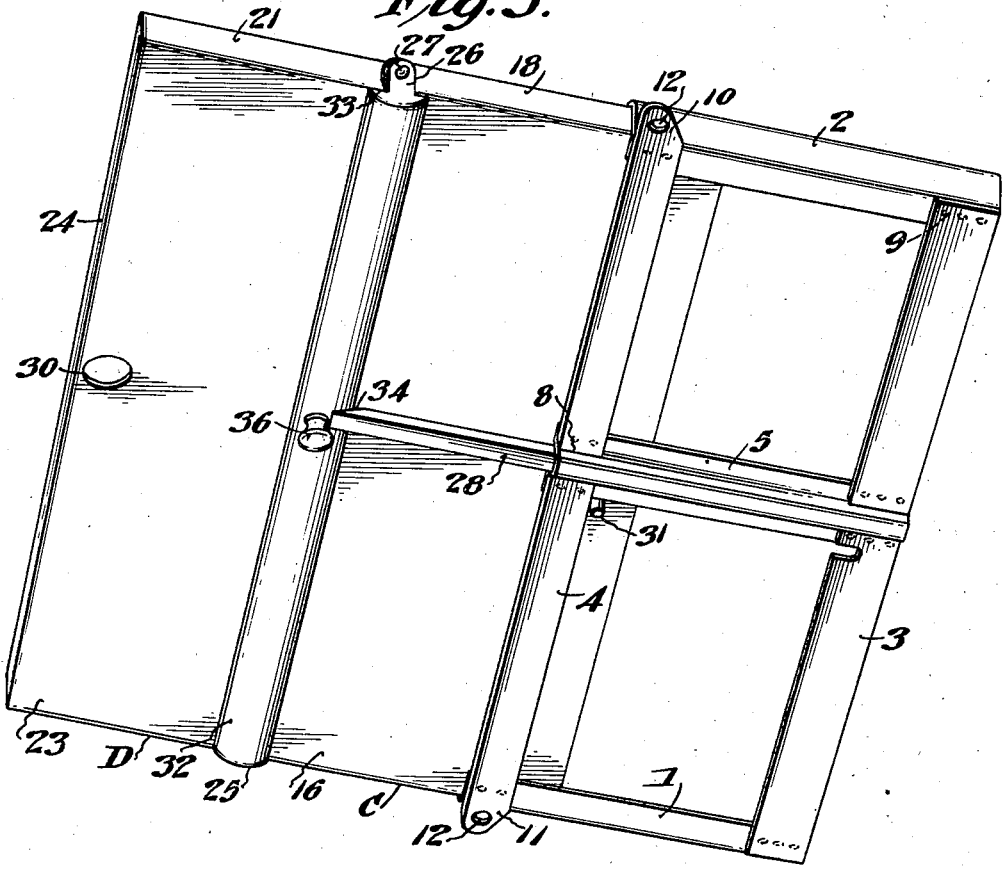
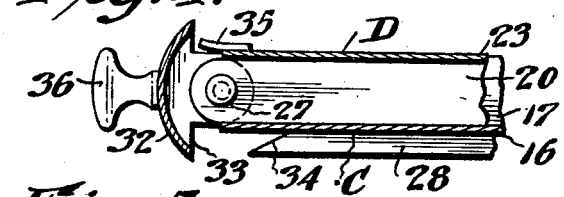
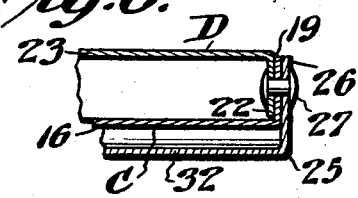
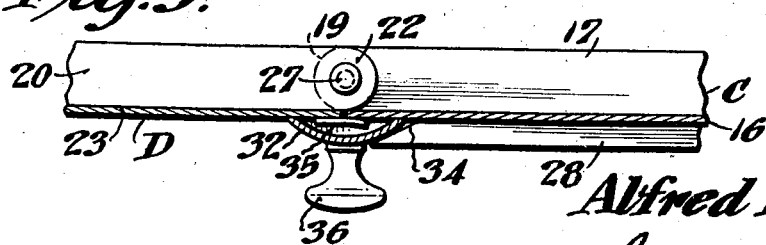
Inventor
Alfred Randall
By Lloyd W. Patel
his Attorney Patented Jan. 20, 1942

2,270,557

UNITED STATES PATENT OFFICE 2,270,557

AUTOMOBILE SHELF

Alfred Randall, Miami, Fla.

Application September 24, 1940, Serial No. 358,168

12 Claims. (Cl. 311—22)

My invention relates to an improvement in an automobile shelf, and particularly to a shelf structure intended and adapted to be installed within an automobile in position to be available for use by an occupant of the automobile as a shelf or table support.

An object of this invention is to provide a shelf structure that can be easily and quickly mounted in an automobile beneath or in conjunction with the usual instrument or dash panel, and which is collapsible and retractable to be entirely out of the way when not in use and is capable of being extended to provide a shelf or table support of ample size and proportions located to be conveniently available to an occupant of the automobile.

Another object is to provide a shelf of this character of simple and inexpensive construction that can be manufactured and sold at low cost to be applied and used in connection with substantially any and all makes and models of automobiles, and with which the extensible shelf parts are adapted to be collapsed and retracted to very compact form within the space available for storage of the shelf, whereby when the shelf is extended a maximum size of supporting shelf or table surface will be presented within the space or confines available.

With the above and other objects in view, some of which will be apparent to those skilled in the art and others of which are inherent in the structure and use, my invention includes certain novel features of construction and combinations and arrangements of parts which will be hereinafter set forth in connection with the drawings and then pointed out in the claims.

In the drawings:

Figure 1 is a fragmentary sectional view through a part of a dash of an automobile showing my invention installed thereon.

Fig. 2 is an enlarged perspective view looking angularly from above and showing the structure with the parts opened and extended.

Fig. 3 is a view similar to Fig. 2 looking angularly from below the shelf structure.

Fig. 4 is an enlarged fragmentary sectional view through the hinge bar with the parts folded.

Fig. 5 is a view similar to Fig. 4 with the parts opened as in position for use.

Fig. 6 is a fragmentary transverse sectional view through the hinge connection.

My invention contemplates provision of a mounting structure to be installed beneath the usual instrument board or dash panel of an automobile, and with the shelf parts foldable and slidable and collapsible whereby the shelf parts can be retracted into the limited space available and yet when the shelf parts are opened a maximum of shelf, table or supporting space will be presented to be conveniently located and readily available for use by an occupant of the automobile as a reading or writing table, lunch table or tray, typewriter desk or stand, drawing board or easel, or as a table or stand or tray or support or shelf available for any desired use or purpose.

The supporting structure generally indicated at A is adapted to be mounted in an automobile beneath the instrument panel or dash board B, and the supporting shelf or table parts consist of a slidable member or section or portion D. The member D is extensible and is retractable to the slidable member C, and this slidable member C is then retractable within the supporting structure A.

The supporting structure A is substantially rectangular when viewed in plan, and is made up of side guide and slide members 1 and 2 substantially U-shaped in cross section and held in spaced relation with their channel faces opposed by transverse bars or members 3 and 4. A channel guideway 5 is mounted beneath the transverse bars 3 and 4 with the channel 6 thereof extending substantially parallel with and intermediate the slide and guideways 1 and 2, and this channel 6 communicates at its rear end with an opening 7 in the transverse bar 3.

The forward transverse bar 4, which also serves as a supporting bar structure, is preferably made in two parts with the channelway portion 6 of the bar 5 extending through the opening 8 between the ends of the parts, and the members 1, 2, 3 and 4 and the member 5 are secured together in a substantially rigid unitary formation, as by spot welding as indicated at 9, or in any other desired and suitable manner. This cross and supporting bar 4 has bearing and mounting ear portions 10 and 11 at its outer ends, and these portions 10 and 11 are provided with fastening receiving openings 12.

As is shown in Fig. 1, the instrument board or dash panel B has the usual flange 13 extending inwardly at its lower edge, and in mounting the supporting structure openings 14 are drilled or otherwise formed through this flange 13 at positions spaced to register with the openings 12 in the bearing and mounting ear portions 10 and 11, and bolts or other fastenings 15 are fitted through these registering openings 12 and 14 and are tightened in place to clamp and securely mount the supporting frame structure A in position beneath and adjacent to the lower edge of the panel or board B, substantially as shown in Fig. 2. In this mounting, the supporting structure is held in place with the open ends of the slide and guideways 1 and 2 and the channel way 6 presented forwardly and immediately beneath the instrument panel or dash board B.

The slidable shelf member C has the supporting portion 16 made of a size corresponding substantially to the space within the rectangular supporting structure A, and the side edges are provided with upstanding rim flanges 17 and 18 adapted to fit and slide freely within the channels of the slide and guideways 1 and 2. At the forward ends these flange portions 17 and 18 are provided with bearings or hinge ears 19. The foldable section D has side flange or rim portions 20 and 21 thereon adapted to fit beneath the opposed faces of the flange portions 17 and 18 and provided with bearing extensions 22 adapted to interfit with the bearing extensions 19 and present the supporting portion 23 of the folding section D in the same plane with the supporting portion 16 of the slidable member C. At its outer or free edge the folding member of section D has a rim flange 24.

A hinge bar 25 has bearing ear portions 26 at the ends thereof provided with openings adapted to register with the openings in the bearing ear extensions 19 and 22 of the members C and D, and hinge pin or bearing members 27 are fitted and connected pivotally through these registering openings so that the member D is hingedly and foldably mounted on the outer edge of the member C, and the hinge bar 25 is hingedly and swingably connected with respect to both the members C and D.

The slidable table member C has a slide and brace bar 28 secured on the under side of the supporting portion 16 thereof in position to fit and slide within the guideway 6 of the member 5, and this slide and brace bar has the inner end thereof bevelled as at 29 so that it will fit through and substantially wedge in the opening 7 when the slidable member C is moved or retracted into the supporting structure A. Since the member C is slidable within the guideways of the portions 1 and 2 and the slide and supporting bar 28 is endwise movable within the guideway 6, the member C is freely movable to the extended position as shown in the drawings and to a retracted position in which the supporting portion 16 and the side flange or rim portions 17 and 18 are substantially housed within the supporting structure A. Since the member D has the hinge and bearing ears 22 disposed within the bearing ears 19 of the member C, this member D can be folded upwardly and inwardly, as indicated by the dotted lines in Figure 1, to lie substantially within the member C, and as this member C is slid into the supporting structure A the swinging member D will also be housed within this supporting structure A. To expedite opening of the swinging or folding section D, a finger or grip opening 30 can be provided through the supporting portion 23 thereof.

The member D is of such width from front to back that it will fit readily within the member C when folded, and the member C will slide or retract to be substantially confined within the supporting structure A; and, to prevent the member C from being accidentally pulled out from the supporting structure I provide a pin 31, or other stop means, thereon adapted to engage with the cross and supporting bar 4, substantially as shown in Fig. 3.

The hinge bar 25 has the back thereof made preferably to be of substantially arc shaped form in cross section, as best shown in Figs. 4 and 5, and this back portion 32 has the edges 33 thereof substantially flattened to bear evenly against the under sides of the portions 16 and 23, as shown in Fig. 5, thereby presenting support to position and hold the supporting portions 16 and 23 in the same place. At its outer end the supporting slide bar 28 is inwardly bevelled, as at 34, and is so formed that when the member D is folded out to the extended position and the hinge bar has the back bar 32 thereof disposed as a rest for the abutting edges of the supporting portions 16 and 23, this inclined face 34 will wedge against the back bar 32, after the manner shown in Fig. 5, thus drawing the edge of the supporting portion 16 down against the rest surface 33 of the back bar 32. To properly align and to support the abutting edge of the supporting portion 23, I provide a clip 35 extending to fit within the opening of the hollow back portion 32 of the hinge bar 25 and catch beneath the abutting edge of the supporting portion 16 of the member C, and in this way the cam surface at 34 and the clip portion at 35 wedge between the adjacent parts of the members C and D and of the hinge bar 25 to thus clamp the several parts in substantially rigid and relatively immovable mounting with the outer surfaces of the supporting or shelf or table portions 16 and 23 of the members C and D disposed in the same plane and with the abutting edges so disposed that a substantially smooth and continuous supporting surface is presented.

When the member D is folded into the member C, the hinge bar 25 can be swung around its mounting on the bearings 27 to cover the space at the forward edge between these members C and D, substantially as shown in Fig. 4, and the hinge bar then serves as a trim strip to cover or mask the shelf structure. A knob 36 is preferably provided on this hinge bar 25 in such position that it will be presented to be readily available to be grasped for pulling the slidable member C outwardly within the supporting structure A to its extended position where the member D can be raised up and swung outwardly to the position for use. When the member C is slid into its retracted position, the tapered end of the slide bar 28 will fit through the opening 7 and in consequence the member C will be somewhat wedged so that it will hold in the retracted position against casual or accidental movement. With the parts in the extended position, as for use, weight placed upon the supporting portions of the shelf will cause the sliding member C to bind within the slide and guideways 1 and 2, and the shelf structure is thereby fixedly held against accidental or casual movement to the retracted position.

The several parts can be made up of sheet metal pressed or stamped or otherwise formed to the desired shape, and the fabricated portions can be spot welded or can be connected or held assembled in any other desired and approved manner. Obviously, the parts may be of sheet metal or of any other suitable material, and can be finished in any desired and appropriate manner.

While I have herein shown and described only certain specific embodiments of my invention and have illustrated only one installation and adaptation, it will be appreciated that many changes and variations can be made in the form and construction of the parts and in the manner of assembly and use, without departing from the spirit and scope of my invention.

I claim:

1. An automobile shelf comprising a supporting structure, a slidable shelf member retractable within and extensible partially from said supporting structure including enclosing side slide members, a folding shelf member carried by said slidable member adapted to be opened out as an extension thereof when said slidable member is extended, and means cooperating between said supporting structure and the slidable shelf member retaining the shelf against being pulled entirely from the supporting structure.

2. An automobile shelf comprising a supporting structure, a slidable member retractable within and extensible from said supporting structure, a folding member carried by said slidable member adapted to be opened out as an extension thereof when said slidable member is extended, and a hinge bar carried substantially at the point of hinging of the folding section.

3. An automobile shelf comprising a supporting structure having shelf encasing side guide and slide members and adapted to be mounted within an automobile, a shelf member slidably mounted in said guideways, and a second shelf member foldably connected with said slidable shelf member.

4. An automobile shelf comprising a supporting structure having guideways, means for mounting said supporting structure within an automobile with open ends of the guideways available, a slidable shelf member having upstanding side flanges mounted in said guideways and movable to retracted and to extended positions, and a folding shelf member having upstanding side flanges swingably mounted at the forward end of the slidable supporting member adapted to be swung out as an extension of the slidable member and to be swung in and retracted to lie over and with its side flanges interfitting with the side flanges of said slidable member.

5. An automobile shelf comprising a supporting structure having guideways, means for mounting said supporting structure within an automobile with open ends of the guideways available, a slidable supporting member mounted in said guideways and movable to retracted and to extended positions, a folding supporting member swingably mounted at the forward end of the slidable supporting member adapted to be swung out as an extension of the slidable member and to be swung in and retracted to lie within said slidable member, and a hinge bar swingably connected substantially at the point of connection between the folding and the slidable members.

6. An automobile shelf comprising a supporting structure having guideways, means for mounting said supporting structure within an automobile with open ends of the guideways available, a slidable supporting member mounted in said guideways and movable to retracted and to extended positions, a folding supporting member swingably mounted at the forward end of the slidable supporting member adapted to be swung out as an extension of the slidable member and to be swung in and retracted to lie within said slidable member, and means including a hinge bar to support said folding member with the supporting portion thereof substantially in the same plane with the supporting portion of the slidable member when said folding member is moved to the extended position.

7. An automobile shelf comprising a supporting structure having guideways, means for mounting said supporting structure within an automobile with open ends of the guideways available, a slidable supporting member mounted in said guideways and movable to retracted and to extended positions, a folding supporting member swingably mounted at the forward end of the slidable supporting member adapted to be swung out as an extension of the slidable member and to be swung in and retracted to lie within said slidable member, a hinge bar swingably connected substantially at the point of connection between the folding and the slidable members, said hinge bar serving to mask and cover the shelf structure when adjusted to the retracted position, and manually engageable means on said hinge bar for moving the slidable member to the extended position.

8. An automobile shelf comprising a supporting structure having guideways, means for mounting said supporting structure within an automobile with open ends of the guideways available, a slidable supporting member mounted in said guideways and movable to retracted and to extended positions, a folding supporting member swingably mounted at the forward end of the slidable supporting member adapted to be swung out as an extension of the slidable member and to be swung in and retracted to lie within said slidable member, a hinge bar swingably connected substantially at the point of connection between the folding and the slidable members, and supporting means carried by one of said members engageable with said hinge bar supporting said shelf when in extended position.

9. An automobile shelf comprising a supporting structure including shelf enclosing side guide and slide members, a slidable member retractable within and extensible from the side guide members of said supporting structure, a folding member carried by said slidable member adapted to be opened out as an extension thereof when said slidable member is extended, a supporting bar carried in the middle by said slidable member and extending substantially parallel with the side guide members, and guideway means in said supporting structure receiving said supporting bar.

10. An automobile shelf comprising a supporting structure consisting of side slide and guide members connected together in spaced opposed relation, means to mount said supporting structure within an automobile with the ends of the slide and guideways available, a slidable supporting member mounted in said slide and guideways and movable to extended and retracted positions, means to limit extending movement of said slidable supporting member, a folding member hingedly and swingably mounted at the outer edge of said slidable member and swingable to a retracted position to lie within the slidable member and to an extended position to serve as an extension of the slidable member, and a hinge bar mounted substantially at the point of swinging mounting of the folding member movable to a position to cover over the edges of the slidable and folding members when in retracted relation and to a second position to support adjacent edges of supporting portions of the slidable and folding members when the shelf structure is extended.

11. An automobile shelf comprising a supporting structure consisting of side slide and guide members connected together in spaced opposed relation, means to mount said supporting structure within an automobile with the ends of the slide and guideways available, a slidable supporting member mounted in said slide and guideways and movable to extended and retracted positions, means to limit extending movement of said slidable supporting member, a folding member hingedly and swingably mounted at the outer edge of said slidable member and swingable to a retracted position to lie within the slidable member and to an extended position to serve as an extension of the slidable member, a hinge bar mounted substantially at the point of swinging mounting of the folding member movable to a position to cover over the edges of the slidable and folding members when in retracted relation and to a second position to support adjacent edges of supporting portions of the slidable and folding members when the shelf structure is extended, and means wedging between said slidable and folding members and said hinge bar for holding the adjacent edges of said members with the supporting portion thereof in a single plane.

12. An automobile shelf comprising a supporting structure having shelf encasing side guide and slide members adapted to be mounted within an automobile, a slidable shelf member retractable within and extensible from said side guide and slide members of the supporting structure, a folding shelf member carried at the outer edge of said slidable member adapted to be opened out to lie in the plane thereof when said slidable member is extended, and a hinge bar mounted substantially at the point of swinging mounting between said sliding and folding shelf members movable to a position to cover over the edges of said shelf members when in retracted relation and to a second position to support adjacent edges of supporting portions of the slidable and foldable members when the shelf structure is extended.

ALFRED RANDALL.